United States Patent
Sellis et al.

(10) Patent No.: US 8,273,429 B2
(45) Date of Patent: Sep. 25, 2012

(54) FABRIC FOR END FRAY RESISTANCE AND PROTECTIVE SLEEVES FORMED THEREWITH AND METHODS OF CONSTRUCTION

(75) Inventors: Timothy David Sellis, West Grove, PA (US); Matthew Ray Taulbee, Downingtown, PA (US); William J. Schrepple, Maple Shade, NJ (US); Philip Edward Marks, Chester Springs, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 625 days.

(21) Appl. No.: 11/654,943

(22) Filed: Jan. 18, 2007

(65) Prior Publication Data

US 2007/0166495 A1 Jul. 19, 2007

Related U.S. Application Data

(60) Provisional application No. 60/760,057, filed on Jan. 19, 2006.

(51) Int. Cl.
*B32B 1/08* (2006.01)
*B32B 15/08* (2006.01)
*B32B 15/04* (2006.01)
*D03D 15/00* (2006.01)

(52) U.S. Cl. ......... 428/36.1; 428/35.8; 442/35; 442/200

(58) Field of Classification Search ................. 428/36.1, 428/36.9, 532, 35.8; 66/170; 156/148; 264/103; 442/35, 200
See application file for complete search history.

(56) References Cited

U.S. PATENT DOCUMENTS

| | | | |
|---|---|---|---|
| 4,183,993 A | | 1/1980 | Banstead et al. |
| 4,281,211 A | * | 7/1981 | Tatum et al. ............... 174/36 |
| 4,661,389 A | | 4/1987 | Mudge et al. |
| 4,671,988 A | | 6/1987 | Dowell et al. |
| 4,680,213 A | * | 7/1987 | Fourezon ................ 428/105 |
| 4,682,480 A | | 7/1987 | Schnegg |
| 4,691,744 A | | 9/1987 | Haver et al. |
| 4,841,749 A | | 6/1989 | Petracek et al. |
| 4,929,478 A | | 5/1990 | Conahgan et al. |
| 5,191,777 A | | 3/1993 | Schnegg |
| 5,364,686 A | | 11/1994 | Disselbeck et al. |
| 5,473,981 A | | 12/1995 | Mazaki |
| 5,585,169 A | | 12/1996 | Schnegg et al. |
| 5,586,454 A | | 12/1996 | Matsuda et al. |
| 5,600,974 A | | 2/1997 | Schnegg et al. |
| 5,616,391 A | | 4/1997 | Amesz et al. |
| 5,632,526 A | | 5/1997 | McLarty, III et al. |
| 5,843,542 A | | 12/1998 | Brushafer et al. |
| 5,855,991 A | | 1/1999 | McLarty, III |

(Continued)

*Primary Examiner* — Erik Kashnikow
(74) *Attorney, Agent, or Firm* — Robert L. Stearns; Dickinson Wright, PLLC

(57) ABSTRACT

An elongated protective textile sleeve for protecting elongate members and methods of constructing a fabric substrate therefore. The fabric substrate has a plurality of filamentary members either woven, knitted or braided with one another. At least some of the filamentary members of the substrate extend to cut edges and are fabricated of a multi-component material that includes a core of a first polymeric material and an outer sheath of a second polymeric material. The outer sheath is heat-fusible and the inner core is heat-settable. The outer sheaths of the filamentary members are heat fused at least in the regions near the cut edges to keep the cut edges from fraying or the filamentary members from pulling out of the substrate. The core is heat set to form the desired shape of the protective sleeve.

14 Claims, 4 Drawing Sheets

U.S. PATENT DOCUMENTS

| | | |
|---|---|---|
| 5,882,322 A | 3/1999 | Kim et al. |
| 5,972,477 A | 10/1999 | Kim et al. |
| 6,056,479 A | 5/2000 | Stevenson et al. |
| 6,632,756 B1 | 10/2003 | Waldrop et al. |
| 2005/0045358 A1 | 3/2005 | Arnold |
| 2005/0054226 A1 | 3/2005 | Akama et al. |

* cited by examiner

FABRIC FOR END FRAY RESISTANCE AND PROTECTIVE SLEEVES FORMED THEREWITH AND METHODS OF CONSTRUCTION

CROSS-REFERENCE TO RELATED APPLICATION

This application claims the benefit of U.S. Provisional Patent Application No. 60/760,057, filed Jan. 19, 2006, which is incorporated herein by reference in its entirety.

BACKGROUND OF THE INVENTION

1. Technical Field

This invention relates generally to textile fabrics and their methods of construction, and more particularly to textile fabrics of the type incorporating engineered filamentary plastics materials that are shaped to form protective sleeves for elongate members.

2. Related Art

Wiring harnesses, hoses, tubing and the like often must endure harsh environmental conditions in automotive, industrial, aerospace, marine and other applications. For example, wire harnesses may be subjected to excessive heat or vibrations during vehicle operation which can damage the wire harness and impair its operation and reduce its useful life. It is common to cover wire harnesses with protective sleeving to protect them from the affects of such harsh environments. One such sleeve includes a woven substrate incorporating a plurality multifilaments and/or monofilaments that are made of an engineered plastics material that can be heat set to form a generally tubular, wrappable product. The filaments near the edges of the sleeve (i.e., near the ends or along the longitudinal split) tend to protrude, fray and/or fall out when the product is cut to length. Apart from being aesthetically unpleasing, the frayed, protruding filaments can contaminate the tubes, hoses or wire harnesses about which the sleeve is disposed by interfering with the ability to properly connect end fittings or couplings with their mating parts. Protective sleeves can also be braided or knit to ultimately take on an elongated tubular form and can include multifilaments and/or monofilaments that, when the sleeve is cut to length, can fray at the ends.

SUMMARY OF THE INVENTION

An elongated protective textile sleeve for the protection of a conduit, hose, wire harness or the like comprises a fabric substrate of a plurality of filamentary members and another material. The substrate can be woven, knit or braided. At least some of the filamentary members of the substrate extend to cut edges and are fabricated of a multi-component material that includes a core of a first polymeric material and an outer sheath of a second polymeric material. The outer sheath is heat-fusible and the inner core is heat-settable. The outer sheaths of the filamentary members are heat fused to the other material at least in the regions near the cut edges to keep the cut edges from fraying or the filamentary members and other material from pulling out of the substrate, while the core is heat set to form the desired shape of the protective sleeve.

According to one presently preferred construction, the substrate includes a plurality of first filamentary members oriented in a first direction and a plurality of second filamentary members oriented in a second direction transverse to the first direction. The first filamentary members are arranged in spaced apart relation to one another and the second filamentary members are arranged in spaced apart relation to one another. The first filamentary members are interlaced with the second filamentary members to define an open mesh. A plurality of elongated strips of non-woven material extend in the first direction in the spaces between the first filamentary members and are interlaced with the second filamentary members. The second filamentary members are fabricated of a multi-material including a core of heat-settable plastics material that is heat shaped to impart a tubular sleeve shape to the substrate and an outer sheath of heat-fusible plastics material that is bonded to the strips of non-woven material of the substrate. The bonding of the second filamentary members to the non-woven strips supports the second filamentary members from fraying at edges of the substrate or from being pulled out of the substrate, particularly when the substrate is cut to length.

According to another presently preferred textile sleeve construction, a substrate of filamentary members are interlaced with one another, wherein at least some of the filamentary members are monofilaments having a core of heat-settable polymeric material and an outer sheath of heat-fusible polymeric material. The outer sheaths of the monofilaments are heat-fused to one another along at least a portion of the sleeve, and preferably adjacent its opposite ends to prevent the sleeve from fraying at its ends, particularly when the sleeve is cut to length.

According to another aspect of the invention, a method is provided for forming a textile fabric. The method includes providing bi-material filamentary members having a core of heat-settable polymeric material and an outer sheath of heat-fusible polymeric material different from the heat-settable polymeric material and at least one material separate from said filamentary members. Then, interlacing the filamentary members with one another and heat-fusing the outer sheath of at least some of the bi-material filamentary members to the at least one material that is different from the heat-settable polymeric material, and then, heat-setting the core of the bi-material filamentary members into a biased shape.

According to yet another aspect of the invention, a method is provided for the constructing an elongate textile sleeve for protecting elongate members wherein the sleeve extends along a length between opposite ends. The method includes providing filamentary members with at least some of the filamentary members being monofilaments having a core of heat-settable polymeric material and an outer sheath of heat-fusible polymeric material. Then, interlacing the filamentary members with one another, and heat-fusing at least a portion of the outer sheaths to other ones of the filamentary members.

BRIEF DESCRIPTION OF THE DRAWINGS

These and other aspects, features and advantages of the invention will become readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
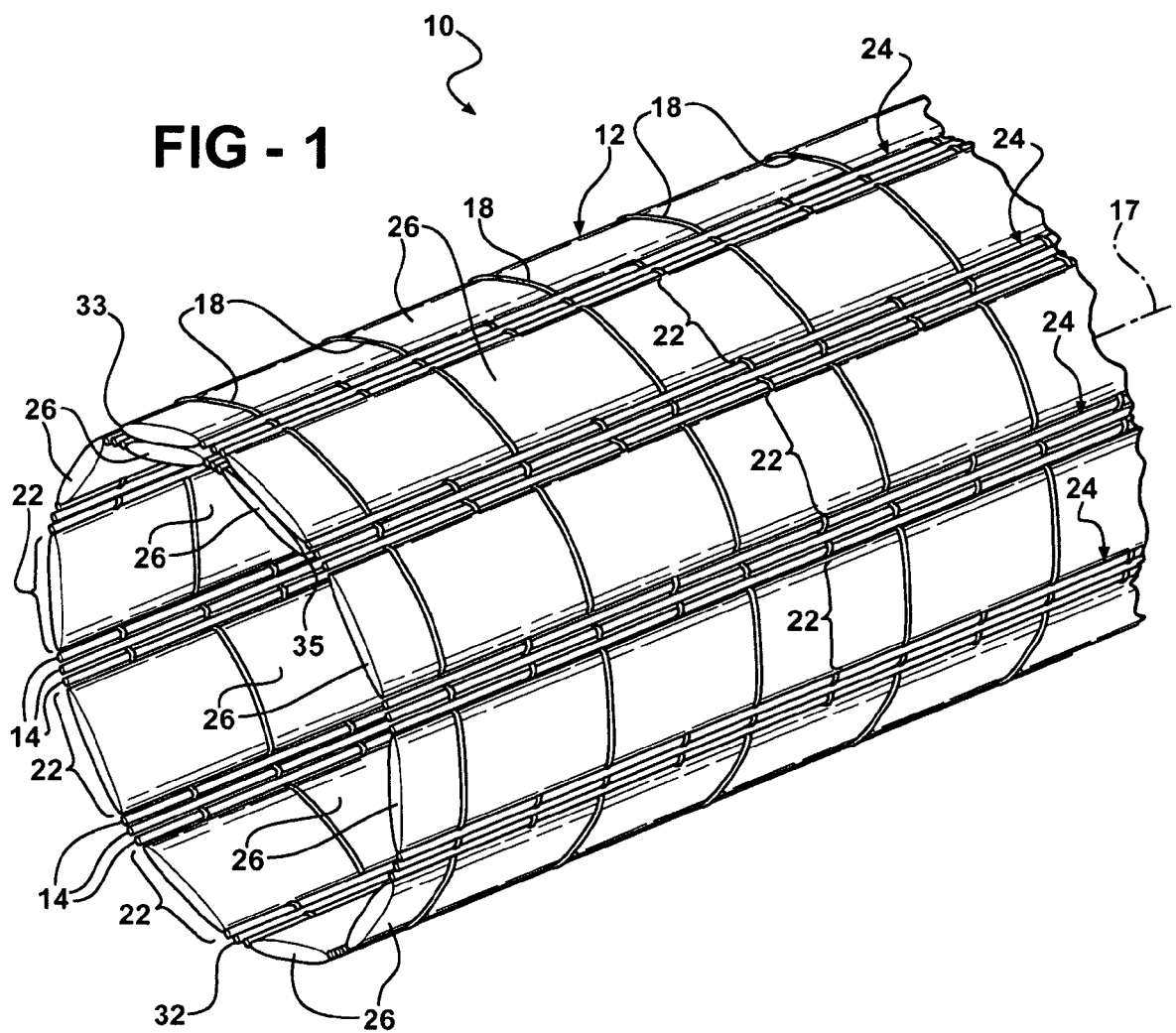
FIG. 1 is a fragmentary perspective view of a tubular sleeve constructed from a textile fabric according to one presently preferred embodiment.
Figure 2:
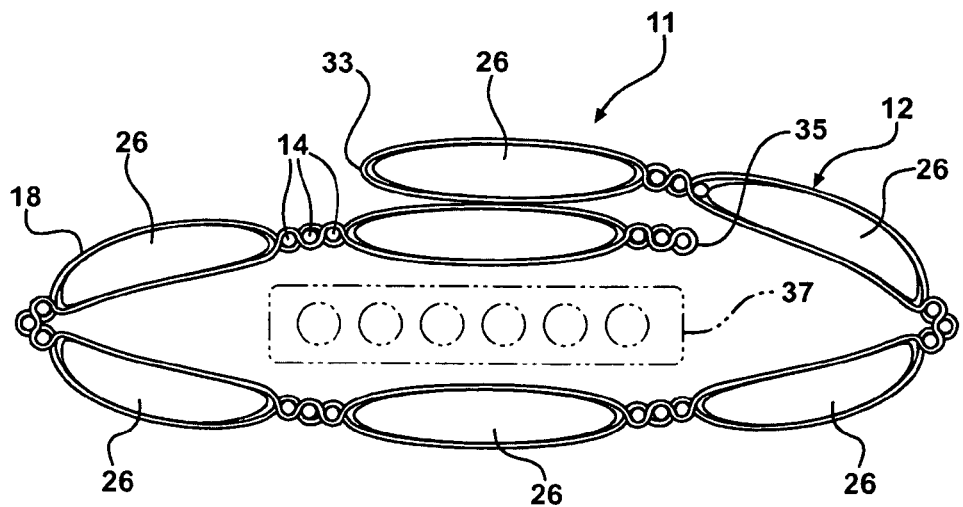
FIG. 2 is an end view of another tubular sleeve constructed from the textile fabric.
Figure 3:
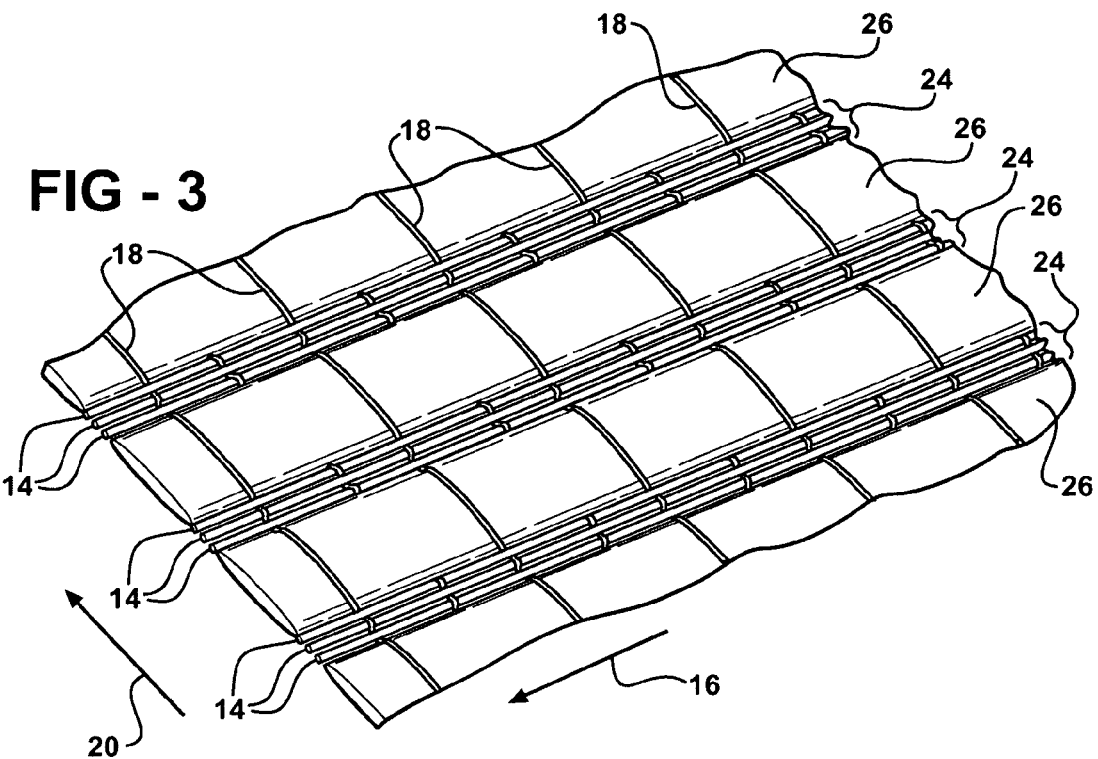
FIG. 3 is an enlarged perspective fragmentary view of the textile fabric of FIGS. 1 and 2.

Referring in more detail to the drawings, FIGS. 1 and 2 illustrate protective textile sleeves 10, 11 according to presently preferred embodiments, wherein the sleeves 10, 11 are similar, however the sleeve 10 is generally cylindrical in lateral cross-section, while the sleeve 11 is generally oval or flat in lateral cross-section. Given the similarities, other than finished shape, the sleeves are generally the same, and thus, the same reference numerals are used to identify their features. The sleeves 10, 11 include a fabric, also referred to as a substrate 12, wherein the substrate has interlaced yarns that can be woven or knitted. By way of example and without limitations, the illustrated sleeves 10, 11 are woven. As best shown in FIG. 3, the substrate 12 includes a plurality of first filamentary members 14 that are oriented in a first direction indicated by arrow 16. For a woven substrate, the arrow 16 corresponds to the warp direction, which corresponds to a longitudinal axis 17 extending along a length of the sleeve 10. The substrate 12 includes a plurality of second filamentary members 18 that are oriented in a second direction indicated by arrow 20. In a woven substrate, the direction indicated by arrow 20 corresponds to the weft or fill direction, which corresponds to a width direction of the sleeve 10. The first filamentary members 14 may be interlaced, such as by being woven, with the second filamentary members 18. In one presently preferred embodiment, at least some of the first filamentary members 14 are spaced apart from adjacent ones of other of the first filamentary fibers 14 such that there are a plurality of generally open spaces 22 between adjacent ones of the spaced first filamentary members 14. As illustrated, the first filamentary members 14 may be arranged in tightly woven groupings 24 of the members 14 such that multiple runs of the members 14 are arranged next to one another, but separated from neighboring groups by the intervening open spaces 22. The second filamentary members 18 are spaced from one another such that an open mesh of the first and second members 14, 18 is defined.

According to the present embodiments, the open spaces 22 are filled with elongated strips of a third non-woven material 26. The strips 26 may comprise non-woven polyester, polypropylene, nylon, fiberglass, elastomeric materials, polymeric materials, foams and the like. The strips 26 are represented here, for example, as being interlaced or woven between the second filamentary members 18 and extend in the same direction as the first filamentary members 14. The strips 26 may extend the full width of the space 22 between adjacent first filamentary members 14. The first filamentary members 14 may comprise monofilaments and/or multi-filament yarns formed of materials such as polyester and the like.

Figure 4:
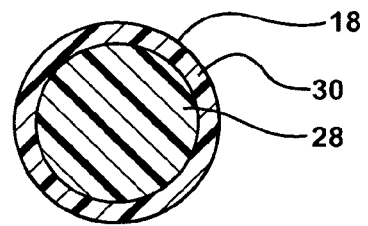
FIG. 4 is a cross-sectional view of a multi-material filament used in the construction of the fabric of FIGS. 1 and 2.

The second filamentary members 18 oriented in the weft direction are preferably multi-material monofilaments. As schematically illustrated in FIG. 4, at least some of the second filamentary members 18 have a core/sheath construction including a core 28 fabricated of an engineered plastics material encased by a sheath 30 of a different plastics material that, when heated, causes the sheath 30 to fuse or bond to the non-woven material strips 26. The sheath 30 may be fabricated of a material that has a lower melting temperature than that of the inner core 28, such as polypropylene, polyethylene, polyester, or the like. The melting and bonding of the sheath 30 to the non-woven strips 26 serves to bond the strips 26 intimately to the second filamentary members 18. This acts to lock the strips 26 in place and further secures the second filamentary members from fraying at cut ends 32 of the substrate 12 or from being pulled out of the substrate 12. The fusing of the second filamentary members 18 across the full width of the non-woven strips 26 acts to prevent lateral movement or bunching of the strips 26 relative to the first filamentary members 14 so as to maintain a tight weave structure regardless of the width used for the non-woven filler strips 26. Accordingly, the strips 26 can vary in width, from being relatively narrow to relatively wide, depending on the intended application of the sleeve.

The inner core 28 of the secondary filamentary members 18 may be fabricated of heat-shapeable, also referred to as heat-settable, engineered plastics material, such as nylon, PPS, or the like. The core 28 enables the substrate 12 to be heat-shaped into the self-wrapping sleeve with opposite edges 33, 35 of the sleeve 10, 11 being arranged in overlapping relation to one another. Upon the cores 28 being heat-set, the cores 28 impart an elastically resilient support of the substrate 12 which enables the edges 33, 35 of the sleeve 10 to be forced open to introduce elongate members, such as a wire harness 37 or other elongate object, for example, into a cavity of the sleeve for protection. After disposing the elongate members 37 in the cavity, the edges 33, 35 of the sleeve 10, 11 return back toward a closed condition under the closing bias force imparted by the cores 28 of the second filamentary members 18. With the sheath 30 bonded to the non-woven strips 26, there is no slippage of the second filamentary members 18 relative to the strips 26, and thus the bonding enhances the tightness and springiness of the curl imparted by the core 28.

Figure 5:
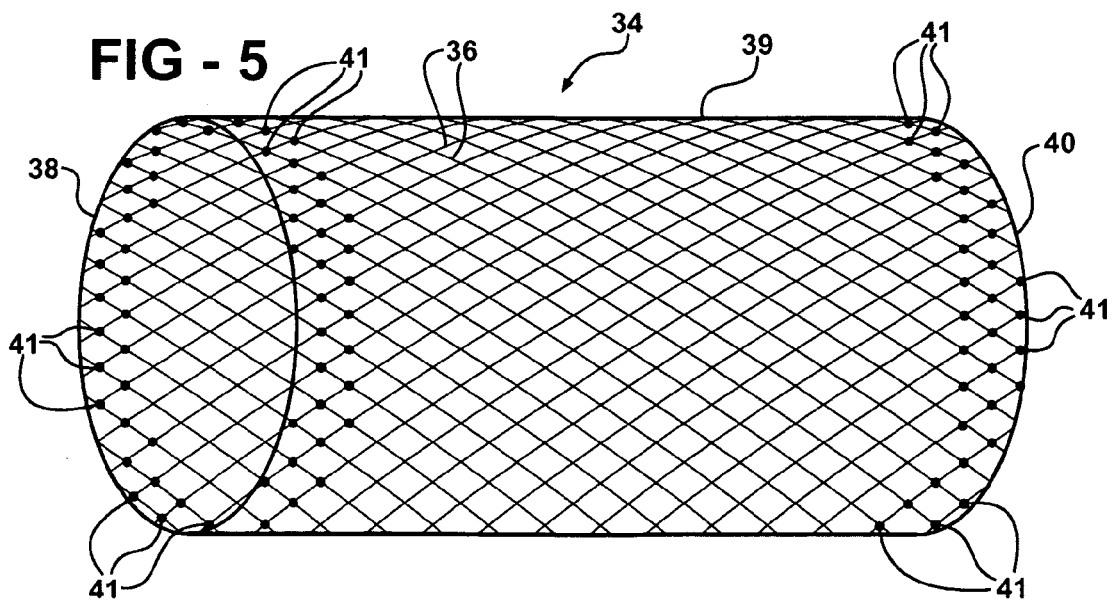
FIG. 5 is a perspective view of another tubular sleeve constructed from a braided textile fabric according to another presently preferred embodiment.

Another presently preferred embodiment of a sleeve 34 construction is illustrated in FIG. 5. This sleeve 34 is a braided or knit construction and has a circumferentially continuous and closed tubular wall 39 along it length, unlike the self-wrapping sleeves of FIGS. 1-2. The sleeve 34 also minimizes or prevents end fray of filamentary members along trimmed opposite ends 38, 40 of the sleeve 34. In this embodiment, the circular knit or braided sleeve is fabricated from a plurality of individual filamentary members, at least some of which comprise monofilament engineered plastics material that is prone to end fraying and/or unraveling upon being cut. Similar to the first embodiment, the sleeve 34 incorporates at least some multi-component monofilaments 36 that have the same core/sheath structure as described above and illustrated in FIG. 4. In this embodiment, at least some of the monofilaments 36 are bonded to themselves and/or to adjacent filamentary members of a different material at selected locations 41, particularly near the opposite cut ends 38, 40 of the sleeve 34 to prevent the monofilaments 36 from fraying, unraveling and/or pulling out of the sleeve 34. As such, the sleeve 34 can be trimmed without worry of harming the protective aspects and/or useful life of the sleeve.

Figure 6:
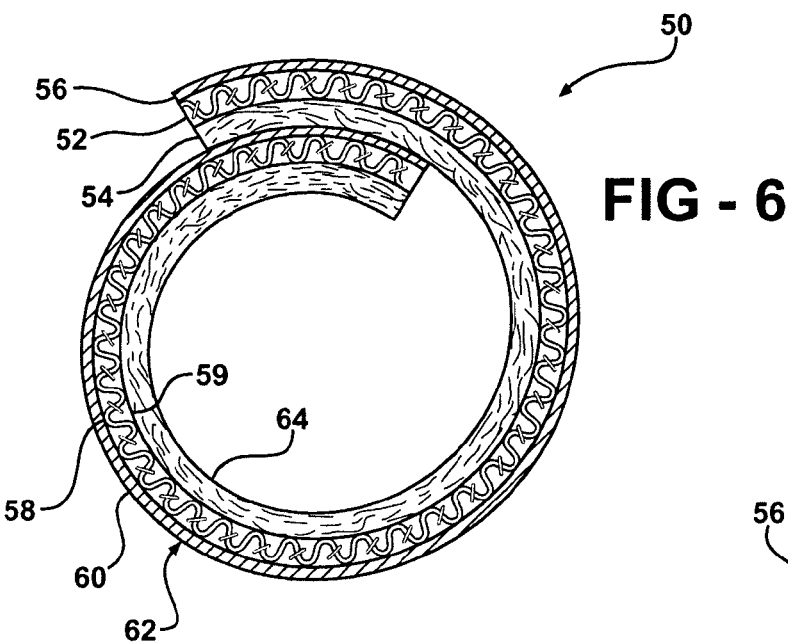
FIG. 6 is a schematic cross sectional end view of a sleeve constructed according to another presently preferred embodiment.
Figure 8:
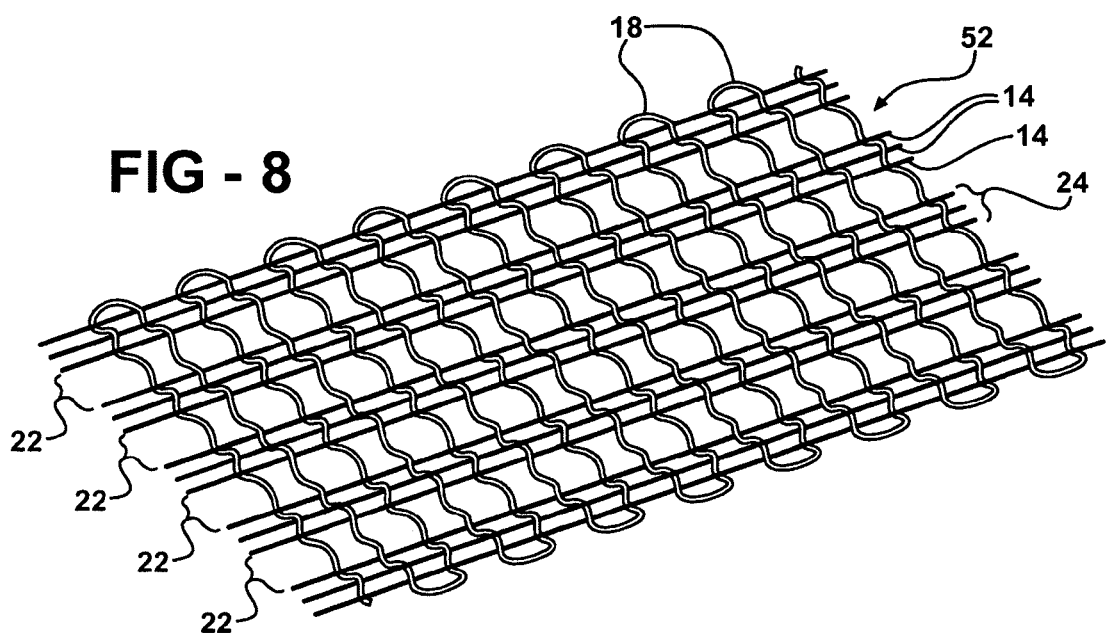
FIG. 8 is a schematic perspective view of the textile substrate of the multilayer material of FIG. 7.

Another presently preferred embodiment of a sleeve 50 construction is illustrated in FIG. 6. The sleeve 50 has a substrate constructed as a central scrim layer 52, preferably having opposite inner and outer layers of material 54, 56 attached thereto. As best shown in FIG. 8, the substrate 52 preferably includes a plurality of first filamentary members 14 that are oriented in a first direction corresponding to a length of the sleeve 50, and a plurality of second filamentary members 18 that are oriented in a second direction corresponding to a width direction of the sleeve 10. The first filamentary members 14 can be woven or otherwise interlaced with the second filamentary members 18, as described above with respect to the first described embodiment. The first filamentary members 14 are spaced from one another to provide a plurality of generally open spaces 22 between adjacent ones of the spaced first filamentary members 14. As illustrated, at least some of the first filamentary members 14 may be arranged in tightly woven groupings 24, wherein the groupings 24 are separated from neighboring groups by the intervening open spaces 22. The second filamentary members 18 are interlaced with the first filamentary members 14 to provide an open mesh construction for the substrate. The second filamentary members 18 are constructed having an inner heat-settable core 28 and an outer heat-fusible sheath 30, as described above and shown in FIG. 4.

Figure 7:
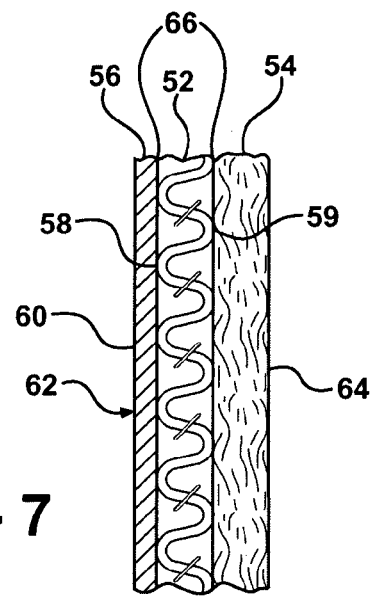
FIG. 7 is a schematic partial cross sectional side view of a multilayer material having a textile substrate of the sleeve of FIG. 6.

The substrate 52 has opposite sides 58, 59, wherein at least one layer of material is attached to one of the sides 58, 59. In this embodiment, as shown in FIGS. 6 and 7, one side 58 of the substrate 52 faces an outer surface 60 of the sleeve 50 and has the outer layer of material 56 attached thereto to provide the outer surface 60. The material 56 has a refractive surface 62, and thus, is provided as a metallic material, for example foil, or a metallized material, such as, for example, metallized mylar. The other side 59 faces an inner surface 64 of the sleeve 50, and has the inner layer of material 54 attached thereto. The inner layer of material 54 is provided as a non-woven insulative material, for example, polyester, polypropylene, nylon, fiberglass, elastomeric materials, polymeric materials, foams and the like. It should be recognized that either of these inner and outer layers of material 54, 56 could be attached on both sides 58, 59 instead of in combination with one another, depending on the application. Accordingly, the substrate 52 could have non-woven materials 54 attached to both sides 58, 59, or refractive materials 56 attached to both sides 58, 59.

To attach the inner and outer layers 54, 56 to the central substrate 52, the layers 54, 56 are preferably heat-fused to the opposite sides 58, 59 of the scrim 52 via the outer sheath 30 of the second filaments 18. This process can be performed in-line with the textile machine that is used to construct the substrate 52, such that the interlaced substrate 52 can exit the textile machine and be bonded directly to at least one of the layers 54, 56, such as by being heat-fused between a pair of heated rollers (not shown). In addition to, or in place of heat-fusing, an adhesive layer 66, such as a pressure sensitive adhesive, for example, could also be used to attach either of the inner and/or outer layers 54, 56 to the substrate 52. The adhesive layer 66 could be a double sided adhesive, for example, and could also be applied to the substrate 52 in-line with the textile machine, as described above, or in a separate process, as desired. As such, one of the layers could be first heat fused to the substrate 52, while the other layer could be attached thereafter via the adhesive layer 66. This provides flexibility in the manufacturing process by allowing the layers 54, 56 to be attached to the substrate 52 in either a single operation, or over separate operations, if desired.

Upon attaching the inner and outer layers 54, 56 to the scrim 52, the multilayered fabric can be formed into the desired protective sleeve shape, such as generally cylindrical, as shown in FIG. 6, or generally flat, as shown in the previous embodiment in FIG. 2, depending on the application. To form the multilayered fabric into its finished shape, the fabric can be cut, if necessary, and formed into the desired shaped, such as through a rolling process between opposed rollers or otherwise formed and/or pressed, wherein heat is applied to the cores 28 of the secondary filaments 18, thereby imparting a heat-set on the cores 18, and thus, to the multilayered fabric. Accordingly, the multilayered fabric is formed to retain the heat-set biased shape, with opposite edges of the multilayered fabric extending along the length of the sleeve preferably being arranged in overlapping relation to one another. As in the embodiments discussed above, with the outer sheaths 30 of the secondary filaments 18 being heat-fused to the laminate inner and outer layers 54, 56, the resulting fabric and sleeve can be cut to length without incurring end fraying or having filaments otherwise separate from the multilayered fabric.

Figure 9:
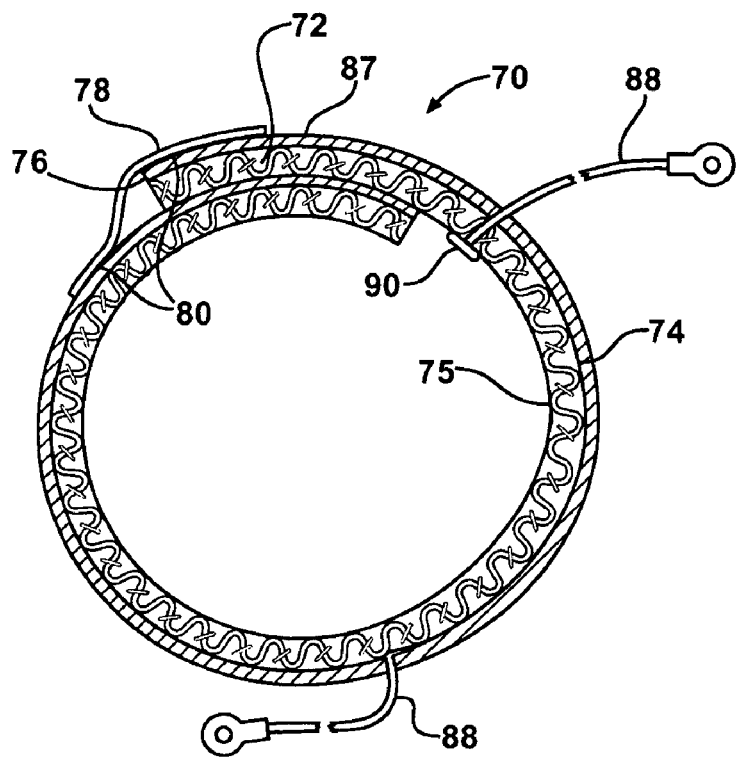
FIG. 9 is a schematic cross sectional end view of a sleeve constructed according to yet another presently preferred embodiment.
Figure 10:
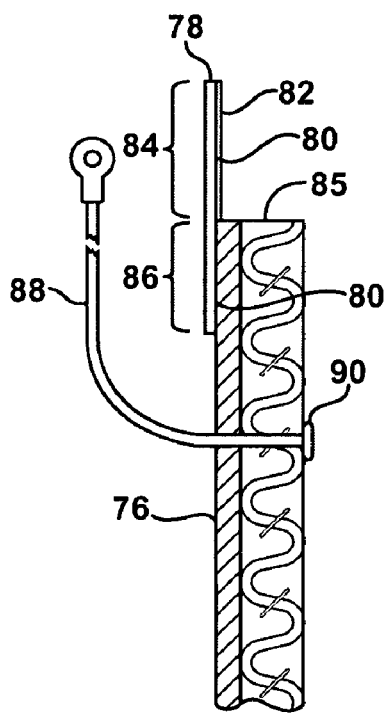
FIG. 10 is a schematic partial cross sectional side view of a multilayer material of the sleeve of FIG. 9 showing a closure mechanism for the sleeve.

Another presently preferred embodiment of a sleeve 70 construction is illustrated in FIG. 9. The sleeve 70 is similar to the sleeve 50 shown in FIG. 6, and it has a central scrim layer 72 constructed the same as described above, such that the scrim or substrate is heat settable via bicomponent filiments. The substrate 72 has opposite sides 74, 75, but unlike the previous embodiment, only one layer, shown here as an outer metal foil layer 76 is attached to the one of the sides 74. Accordingly, the other side 75 of the scrim 72 remains exposed, thereby resulting in a finished sleeve having a reduced weight and thickness. As discussed above, the foil layer 76 can be attached to the substrate 72 via a heat fusing process, wherein the foil layer 76 is bonded to an outer heat-fusible sheath 30 of the monofiliaments 18 used in construction of the substrate 72. Upon attaching the foil layer 76 to the substrate 72, the substrate can be heat set into a generally tubular for such that the sleeve 70 is biased into a self-curled shaped.

To ensure the sleeve 70 remains wrapped about the elongate members, an additional closure mechanism 78 can be incorporated to prevent the sleeve 70 from inadvertently unwrapping, thereby providing added protection to the elongate members. The closure mechanism 78 is provided preferably provides a circumferentially continuous foil layer about the sleeve 70, thereby enhancing the EMI protective capabilities of the sleeve 70. Accordingly, the closure mechanism 78 is provide as a foil layer having a self adhesive surface 80. A portion 84 of the self adhesive surface is covered partially by a release paper 82 to prevent the adhesive surface 80 extending beyond an edge 85 of the sleeve 70 from becoming contaminated or sticking to other surfaces prior to the sleeve 70 being installed on the elongate members to be protected. Another portion 86 of the self adhesive surface 80 has the release paper 82 removed therefrom so that the exposed adhesive can be bonded to an outer surface 87 of the foil layer 76. With the foil layer closure mechanism 78 extending beyond the edge 85 of the foil layer 76, upon wrapping the sleeve 70 about the elongate members and removing the release paper 82, the adhesive surface 80 of the closure foil 78 can be adhered to the outer surface 87 of the overlapped sleeve edge to lock the sleeve edges in overlapping arrangement to one another. As such, the sleeve 70 has a circumferentially continuous outer foil surface to enhance the sleeve ability to provide protection against EMI.

To further enhance the EMI shielding capability of the sleeve 70, at least one drain wire 88 can be attached for conductive electrical communication with the outer foil layer 76. As shown, the drain wire 88 can be fastened to any portion of the sleeve 70, such as via a rivet connection 90, for example. Otherwise, the an end of the drain wire 88 could be bonded between the substrate 72 and the outer foil layer 76, as shown by way of example in FIG. 9, during the process of heat-fusing or attaching the outer foil layer 76 to the substrate 72.

Obviously, many modifications and variations of the present invention are possible in light of the above teachings. It is, therefore, to be understood that within the scope of the appended claims, the invention may be practiced otherwise than as specifically described.

What is claimed is:

1. A textile fabric, comprising:
   a substrate having filamentary members interlaced with one another, said filamentary members include first filamentary members oriented in a warp extending first direction and a plurality of second filamentary members oriented in a weft extending second direction generally transverse to said first direction, at least some of said first filamentary members being spaced from one another to provide a plurality of separate warp extending spaces between said spaced first filamentary members, at least some of said secondary filamentary members being monofilaments having a core of heat-settable polymeric material and an outer sheath of heat-fusible polymeric material;
   a plurality of strips of material separate from said substrate interlaced with said second filamentary members in at least some of said spaces, said strips of material having oppositely facing inner and outer sides and extending parallel to said first direction and transverse to said second direction; and
   wherein said outer sheath of at least some of said monofilaments abuts said outer side of each of said strips over a single circumferential extent and said outer sheath of at least some of said monofilaments abuts said inner side of each of said strips over a single circumferential extent, at least some of said outer sheaths being heat-fused to said material and said core of said at least some of said monofilaments being heat-shaped into a biased shape.

2. The textile fabric of claim 1 wherein said first filamentary members are arranged in groups of two or more filaments adjacent one another, said groups being separated from one another by said spaces.

3. The textile fabric of claim 1 wherein said biased shape is a tubular sleeve having a longitudinal axis, said first filamentary members and said material extends generally along and parallel to said axis.

4. The textile fabric of claim 1 wherein at least some of said second filamentary members are provided as said monofilaments and at least some of said first filamentary members are provided as multifilaments.

5. The textile fabric of claim 1 wherein said substrate is woven.

6. The textile fabric of claim 1 wherein said substrate is knitted.

7. The textile fabric of claim 1 wherein said material is a non-woven material.

8. The textile fabric of claim 7 wherein said substrate has opposite sides, further including at least one material being heat-fused to one of said opposite sides with a refractive surface facing outwardly from said opposite sides.

9. The textile fabric of claim 8 wherein said refractive surface is metal foil.

10. The textile fabric of claim 8 wherein said refractive surface is coated.

11. The textile fabric of claim 9 wherein said biased shaped is tubular having opposite edges and further comprising a metal foil strip adhered to said edges and forming a circumferentially continuous metal foil outer layer.

12. The textile fabric of claim 11 further comprising a metal drain wire arranged in conductive electrical communication with said metal foil outer layer.

13. The textile fabric of claim 9 further comprising another layer of non-woven material attached to the other of said opposite sides.

14. The textile fabric of claim 13 wherein said biased shaped is tubular having inner and outer surfaces, said metal foil layer forming said outer surface and said non-woven material forming said inner surface.

* * * * *